United States Patent
Zhang et al.

(10) Patent No.: US 11,274,788 B2
(45) Date of Patent: Mar. 15, 2022

(54) GIMBAL POSE CORRECTION METHOD AND DEVICE

(71) Applicant: SZ DJI TECHNOLOGY CO., LTD., Shenzhen (CN)

(72) Inventors: Xiang Zhang, Shenzhen (CN); Bing Li, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/075,034

(22) Filed: Oct. 20, 2020

(65) Prior Publication Data

US 2021/0033242 A1    Feb. 4, 2021

Related U.S. Application Data

(63) Continuation of application No. PCT/CN2018/084499, filed on Apr. 25, 2018.

(51) Int. Cl.
| | | |
|---|---|---|
| *F16M 11/18* | (2006.01) | |
| *G01C 21/16* | (2006.01) | |
| *F16M 11/04* | (2006.01) | |
| *G03B 17/56* | (2021.01) | |
| *G05D 3/12* | (2006.01) | |
| *F16M 11/10* | (2006.01) | |
| *F16M 11/12* | (2006.01) | |

(52) U.S. Cl.
CPC .............. *F16M 11/18* (2013.01); *F16M 11/04* (2013.01); *F16M 11/046* (2013.01); *F16M 11/10* (2013.01); *F16M 11/12* (2013.01); *G01C 21/1656* (2020.08); *G03B 17/56* (2013.01); *G03B 17/561* (2013.01); *G05D 3/12* (2013.01); *F16M 2200/00* (2013.01)

(58) Field of Classification Search
CPC ........ F16M 11/18; F16M 11/04; F16M 11/10; F16M 11/12; F16M 11/56; F16M 2200/00; G01C 21/1656; G03B 17/56; G03B 17/561; G05D 3/12
USPC ........................................................ 396/428
See application file for complete search history.

(56) References Cited

U.S. PATENT DOCUMENTS

| | | | |
|---|---|---|---|
| 6,965,397 | B1 | 11/2005 | Honey et al. |
| 2014/0267778 | A1 | 9/2014 | Webb et al. |
| 2016/0273921 | A1 | 9/2016 | Zhou et al. |

FOREIGN PATENT DOCUMENTS

| | | |
|---|---|---|
| CN | 102355574 A | 2/2012 |
| CN | 102707734 A | 10/2012 |
| CN | 102768042 A | 11/2012 |
| CN | 103900473 A | 7/2014 |

(Continued)

OTHER PUBLICATIONS

The World Intellectual Property Organization (WIPO) International Search Report for PCT/CN2018/084499 dated Sep. 4, 2018 4 Pages (including translation).

*Primary Examiner* — Clayton E. LaBalle
*Assistant Examiner* — Kevin C Butler
(74) *Attorney, Agent, or Firm* — Anova Law Group, PLLC

(57) ABSTRACT

A gimbal pose correction method includes obtaining a first pose of a gimbal based on an Inertial Measurement Unit (IMU) arranged at a vertical compensation device configured to be coupled to the gimbal and compensate for movement of the gimbal in a vertical direction, obtaining a second pose of the vertical compensation device based on a vision device arranged at the vertical compensation device, and correcting the first pose according to the second pose.

20 Claims, 3 Drawing Sheets

(56) References Cited

FOREIGN PATENT DOCUMENTS

| | | |
|---|---|---|
| CN | 104698485 A | 6/2015 |
| CN | 104833352 A | 8/2015 |
| CN | 107278246 A | 10/2017 |
| WO | 2017011945 A1 | 1/2017 |

GIMBAL POSE CORRECTION METHOD AND DEVICE

CROSS-REFERENCE TO RELATED APPLICATION

This application is a continuation of International Application No. PCT/CN2018/084499, filed on Apr. 25, 2018, the entire content of which is incorporated herein by reference.

TECHNICAL FIELD

The present disclosure relates to the technical field of gimbal control and, more particularly, to a gimbal pose correction method and device.

BACKGROUND

Pose estimation is one of the key problems to be solved in robot control. The pose estimation refers to obtaining position, velocity, attitude, and heading information that satisfies requirements of control bandwidth, dynamic performance, stability, and accuracy according to data from various motion state sensors. A system providing instant pose information is called a navigation system. The navigation system generally includes an inertial navigation system, a global navigation satellite system (GNSS), a Doppler navigation system, a visual navigation system, and the like. Integrated navigation technology uses a plurality of different navigation systems to measure a same information source, extracts and corrects errors of each navigation system using measured values. Integrated navigation technology is one of the important applications in the field of multi-sensor information fusion state estimation.

Inertial-GNSS integrated navigation is one of the commonly used integrated navigations. Conventional inertial-GNSS integrated navigations use the north-east-down (NED) coordinate system as a navigation coordinate system, and hence need a north-pointing heading observation and generally use a geomagnetic sensor to provide a reference heading. However, the geomagnetic sensor is susceptible to interference from electric current and magnetic field. In addition, the conventional inertial-GNSS integrated navigations use latitude and longitude to represent the position, such that the GNSS needs to provide position measurement in the form of latitude and longitude. Therefore, the GNSS navigation cannot work in an indoor environment. Conventional single-point GNSS's generally have position and velocity measurement errors at m-level, but in some applications, the velocity control accuracy is needed to be mm-level, and hence, the inertial-GNSS integrated navigations cannot satisfy the accuracy requirements.

SUMMARY

In accordance with the disclosure, there is provided a gimbal pose correction method including obtaining a first pose of a gimbal based on an Inertial Measurement Unit (IMU) arranged at a vertical compensation device configured to be coupled to the gimbal and compensate for movement of the gimbal in a vertical direction, obtaining a second pose of the vertical compensation device based on a vision device arranged at the vertical compensation device, and correcting the first pose according to the second pose.

Also in accordance with the disclosure, there is provided a gimbal pose correction device including a vertical compensation device, and a vision device and an Inertial Measurement Unit (IMU) both arranged at and electrically coupled to the vertical compensation device. The vertical compensation device is configured to be connected to a gimbal and compensate for movement of the gimbal in a vertical direction. The vertical compensation device is further configured to obtain a first pose of the gimbal based on the IMU, obtain a second pose of the vertical compensation device based on the vision device, and correct the first pose according to the second pose.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples and other drawings conceived by those having ordinary skills in the art on the basis of the described drawings without inventive efforts should fall within the scope of the present disclosure.

Figure 1:
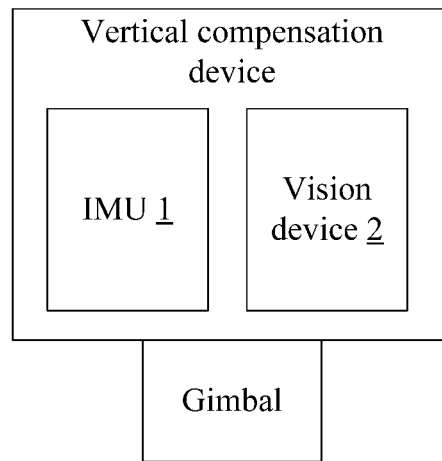
FIG. 1 is a schematic structural diagram of a gimbal pose correction device consistent with embodiments of the disclosure.

| Description of Reference Numerals | | | |
|---|---|---|---|
| 1 | Inertial measurement unit (IMU) | 2 | Vision device |
| 3 | Main body | 31 | Body |
| 32 | Base | 33 | Handheld member |
| 4 | Axis arm | 5 | Motor |
| 6 | Angular velocity sensor | | |

DETAILED DESCRIPTION OF THE EMBODIMENTS

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Hereinafter, the gimbal pose correction method and device consistent with the disclosure will be described in detail with reference to the accompanying drawings. Unless conflicting, the exemplary embodiments and features in the exemplary embodiments can be combined with each other.

FIG. 1 is a schematic structural diagram of an example gimbal pose correction device consistent with the disclosure. As shown in FIG. 1, a gimbal is connected to a vertical compensation device, and the vertical compensation device can compensate for a movement of the gimbal in a vertical direction. In some embodiments, the gimbal can be mounted on a movable object, e.g., a user, an unmanned aerial vehicle (UAV), or a robot, through the vertical compensation device. When the movable object moves, there is a movement in the vertical direction, and the movement in the vertical direction can result in unstable images of a camera on the gimbal. Therefore, the vertical compensation device can be used to compensate for the movement of the gimbal in the vertical direction. Compared with a situation that the gimbal is directly mounted on the movable object and moves with the movable object, the vertical movement of the gimbal can be reduced, thereby ensuring the smooth images of the camera.

Figure 2:
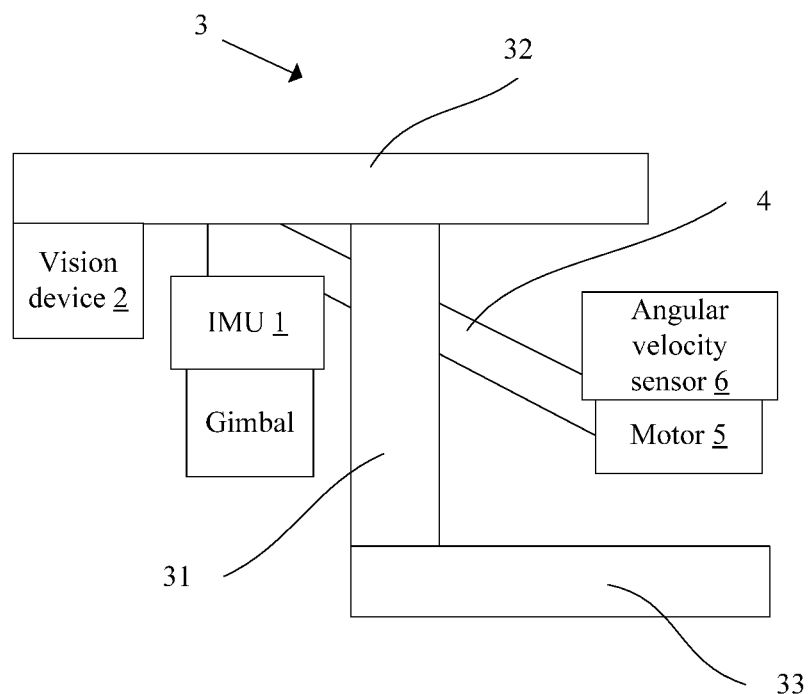
FIG. 2 is a schematic structural diagram of another gimbal pose correction device consistent with embodiments of the disclosure.
Figure 3:
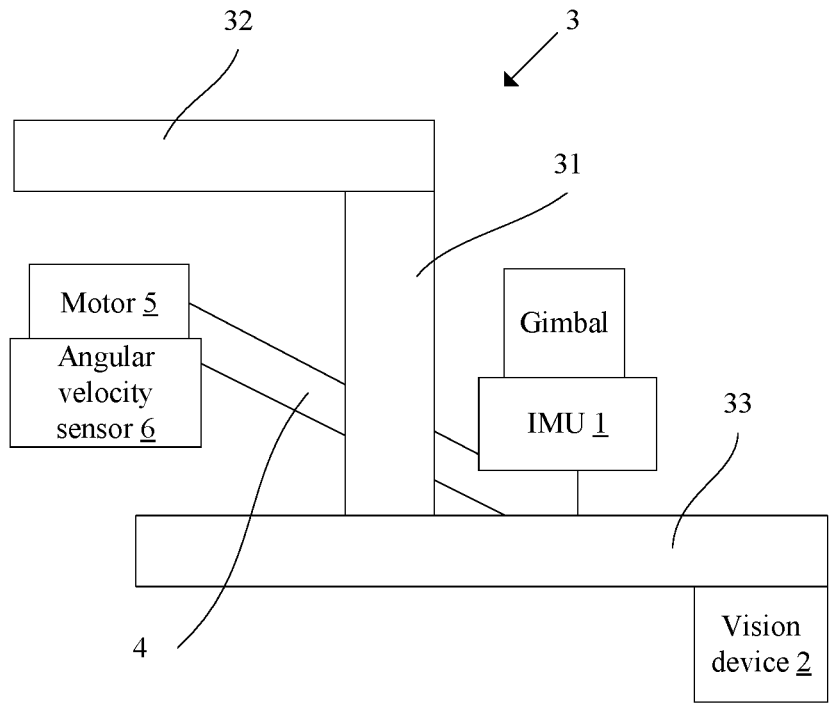
FIG. 3 is a schematic structural diagram of another gimbal pose correction device consistent with embodiments of the disclosure.

The vertical compensation device includes a vision device 2 and an inertial measurement unit (IMU) 1. FIGS. 2 and 3 are schematic structural diagram of other examples of the gimbal pose correction device consistent with the disclosure. As shown in FIGS. 2 and 3, the vertical compensation device includes a main body 3 and an axis arm 4 connected to the gimbal. The axis arm 4 can rotate to compensate for the movement of the gimbal in the vertical direction. In some embodiments, a motor 5 is arranged at a main body 3, and the motor 5 can be configured to drive the axis arm 4 to rotate. In some other embodiments, the axis arm 4 can also be driven to rotate by other driving devices. The IMU 1 can be arranged at the axis arm 4, and the IMU 1 can be arranged at an end of the axis arm 4 connected to the gimbal. In some embodiments, the IMU 1 can be arranged at any other position of the axis arm 4.

The vision device 2 can be arranged at the main body 3, and a detection direction of the vision device 2 can be upward or downward. For example, when a gimbal pose correction system is located in an outdoor environment, the vision device 2 can face downward, and when the gimbal pose correction system is located indoors, the vision device 2 can face upward or downward. In some embodiments, the detection direction of the vision device 2 can be approximately parallel to the vertical direction, and the detection direction of the vision device 2 can have a small tilt angle relative to the vertical direction (an angle range of the tilt angle can be set according to empirical values). In some embodiments, the vision device 2 can monitor vertically upwards or vertically downwards. As shown in FIGS. 2 and 3, the main body 3 includes a body 31 and a base 32 fixedly connected to the body 31, and the vision device 2 is arranged at the base 32.

In some embodiments, the gimbal can be mounted at a UAV, a mobile robot, or another movable device through the base 32. During the movement of the UAV, mobile robot, or other movable devices, there is the movement in the vertical direction that affects the images of the camera (i.e., the camera on the gimbal). The vertical compensation device can compensate for the movement in the vertical direction to offset an influence of the movement in the vertical direction on the images of the camera.

In some embodiments, as shown in FIGS. 2 and 3, the vertical compensation device may include a handheld device, and the compensation device includes a handheld member 33 fixedly connected to the body 31. The user can hold the handheld member 33 to drive the vertical compensation device to move as a whole. When the user is walking, the movement in the vertical direction along with a stride frequency can affect the images of the camera, and the vertical compensation device can compensate for the vertical movement to offset the influence of the movement in the vertical direction on the images of the camera.

Hereinafter, a body coordinate system $\{b\}$-$O_b x_b y_b z_b$ can be defined as follows. An origin of the coordinate system $O_b$ can be a geometric center of a plane at which the axis arm 4 is connected to an end of the gimbal corresponding to an axis. $x_b$ axis can be in a vertical symmetry plane of the body 31 and parallel to a bottom surface of the base 32, and can point forward. $y_b$ axis can be perpendicular to the vertical symmetry plane of the body 31 and can point to a right side of the body 31. $z_b$ axis can be in the vertical symmetry plane of the body 31 and perpendicular to the $x_b$ axis, and can point below the body 31.

A base coordinate system $\{p\}$-$O_p x_p y_p z_p$ of the base 20 can be defined as follows. An origin of the coordinate system $O_p$ can be a center of the axis arm 4, i.e., an intersection of a rotation center line of the axis arm 4 and the vertical symmetry plane of the body 31. $x_p$ axis can be in the vertical symmetry plane of the body 31 and parallel to the bottom surface of the base 32, and can point forward. $y_p$ axis can be perpendicular to the vertical symmetry plane of the body 31 and can point to the right side of the body 31. $z_p$ axis can be in the vertical symmetry plane of the body 31 and perpendicular to the $x_p$ axis, and can point below the body 31.

A camera coordinate system can be denoted by $\{c\}$-$O_c x_c y_c z_c$, and a navigation coordinate system can be denoted by $\{n\}$-$O_n x_n y_n z_n$. An origin of the navigation coordinate system $O_n$ can be determined by a vertical projection of an origin of the camera coordinate system $O_c$ on the ground when the system starts to work. Coordinate axis of the navigation coordinate system can be determined by an output of the vision device 2. The vision device 2 can output a pose of the camera coordinate system $\{c\}$ relative to the navigation coordinate system $\{n\}$. In some embodiments, the vision device 2 can output a reference position $P_{nc}^n$, a reference velocity $V_{nc}^n$, and a reference attitude $\bar{q}_c^n$ of the vertical compensation device. In some other embodiments, the vision device 2 can output the reference position $P_{nc}^n$ and the reference velocity $V_{nc}^n$ of the vertical compensation device.

Figure 4:
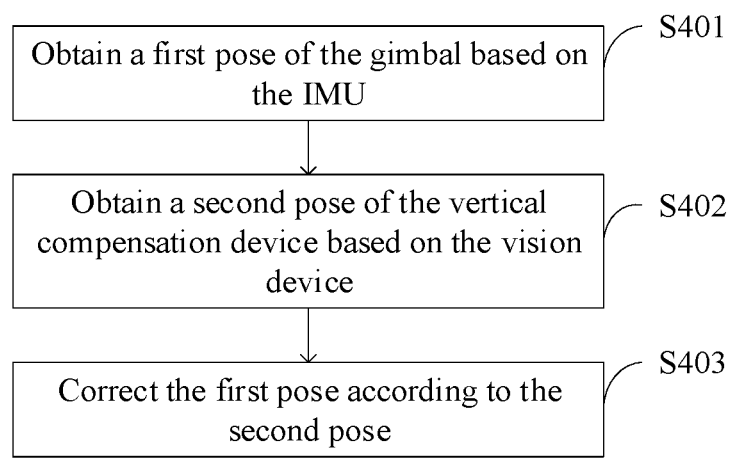
FIG. 4 is a schematic flow chart of a gimbal pose correction method consistent with embodiments of the disclosure.

FIG. 4 is a schematic flow chart of an example gimbal pose correction method consistent with the disclosure. An execution entity of the method may include a processor of the vertical compensation device, or an independent control device communicatively connected to the processor of the vertical compensation device.

As shown in FIG. 4, at S401, a first pose of the gimbal is obtained based on the IMU 1. The first pose may include the velocity, position, and attitude of the gimbal.

The IMU 1 may include a gyroscope and an accelerometer. In some embodiments, the gyroscope can include a three-axis gyroscope, and the accelerometer can include a three-axis accelerometer. The process at S401 can include obtaining an angular velocity of the gimbal based on the gyroscope, obtaining a specific force of the gimbal based on the accelerometer, and then calculating the attitude, velocity, and position of the gimbal based on the angular velocity and the specific force.

In some embodiments, the method further includes updating the attitude of the gimbal. Updating the attitude of the gimbal can include designing an attitude update formula according to the angular velocity and the specific force, and updating the attitude of the gimbal according to the attitude update formula.

In some embodiments, a design process for the attitude update formula can be as follows. An ideal output of the gyroscope, denoted as $\omega_{ib}^b$, can include a projection of a rotation angular rate of the body coordinate system $\{b\}$ relative to an inertial system $\{i\}$ in the $\{b\}$ system, and an actual output of the gyroscope is denoted as $\bar{\omega}_{ib}^b$. An ideal output of the accelerometer, denoted as $f^b$, can include a projection of the specific force in the {b} system, and the actual output of the accelerometer can be denoted as $\tilde{f}^b$.

A quaternion $q_b{}^n$ can be used as a representation of the attitude of the {n} system relative to the {b} system, and an error-free ideal quaternion differential formula can be determined by the following formula:

$$\dot{q}_n{}^b = \tfrac{1}{2}\omega_{nb}{}^b \otimes q_n{}^b = \tfrac{1}{2}\Omega(\omega_{nb}{}^b)q_n{}^b \tag{1}$$

The attitude angular rate in Formula (1) can be determined by the following formula:

$$\omega_{nb}{}^b = \omega_{ib}{}^b - \omega_{in}{}^b = \omega_{ib}{}^b - C_n{}^b(\omega_{ie}{}^n + \omega_{en}{}^n) \tag{2}$$

Formula (2) can be determined by a latest updated attitude value, $\omega_{ie}{}^n$ and $\omega_{en}{}^n$ are the earth's rotation angular rate and position angular rate. The method consistent with the disclosure is suitable for a moving shoot at a low-velocity and short-distance, and near the ground, such that $\omega_{ie}{}^n$ and $\omega_{en}{}^n$ can be approximately ignored, and thus, $\omega_{nb}{}^b \approx \omega_{ib}{}^b$. In an actual system, due to an existence of a gyroscope measurement error and a navigation solution error, an actual solution of the quaternion differential formula can be performed by the following formula:

$$\dot{\hat{q}}_n{}^b = \tfrac{1}{2}\hat{\omega}_{nb}{}^b \otimes \hat{q}_n{}^b \approx \tfrac{1}{2}\Omega(\hat{\omega}_{ib}{}^b)q_n{}^b \tag{3}$$

An actual body coordinate system determined by $\hat{q}_b{}^n$ can be denoted as {b'}. Discretize the quaternion differential formula shown in Formula (1) and use the first-order approximation, the quaternion update formula shown below can be obtained:

$$\hat{q}_b{}^n(t_{k+1}) = \hat{q}_b{}^n(t_k) + \tfrac{1}{2}\Omega(\hat{\omega}_{ib}{}^b(t_{k+1}))\Delta t \cdot \hat{q}_b{}^n(t_k) \tag{4}$$

According to Formula (4), an attitude matrix $\hat{C}_n{}^b$ can be obtained by updating the attitude quaternion, which actually can establish a mathematical platform of strapdown inertial navigation.

In some embodiments, the method further includes updating the velocity of the gimbal. Updating the velocity of the gimbal can include designing a velocity update formula according to the angular velocity and the specific force, and updating the velocity of the gimbal according to the velocity update formula. For example, the following formula can be used as the approximate velocity update formula:

$$\hat{V}^n(t_{k+1}) = \hat{V}^n(t_k) + C_b{}^n \hat{f}^b(t_{k+1}) \cdot \Delta t \tag{5}$$

In some embodiments, the method further includes updating the position of the gimbal. Updating the position of the gimbal can include designing a position update formula according to the angular velocity and the specific force, and updating the position of the gimbal according to the position update formula. For example, the following formula can be used as the approximate position update formula:

$$\hat{P}^n(t_{k+1}) = \hat{P}^n(t_k) + \hat{V}^n(t_{k+1}) \cdot \Delta t + \tfrac{1}{2} C_b{}^n \hat{f}^b(t_{k+1}) \cdot \Delta t^2 \tag{6}$$

It can be appreciated that the attitude update formula, velocity update formula, and position update formula described above are merely examples, which are not limited herein.

At S402, a second pose of the vertical compensation device is obtained based on the vision device 2.

Figure 5:
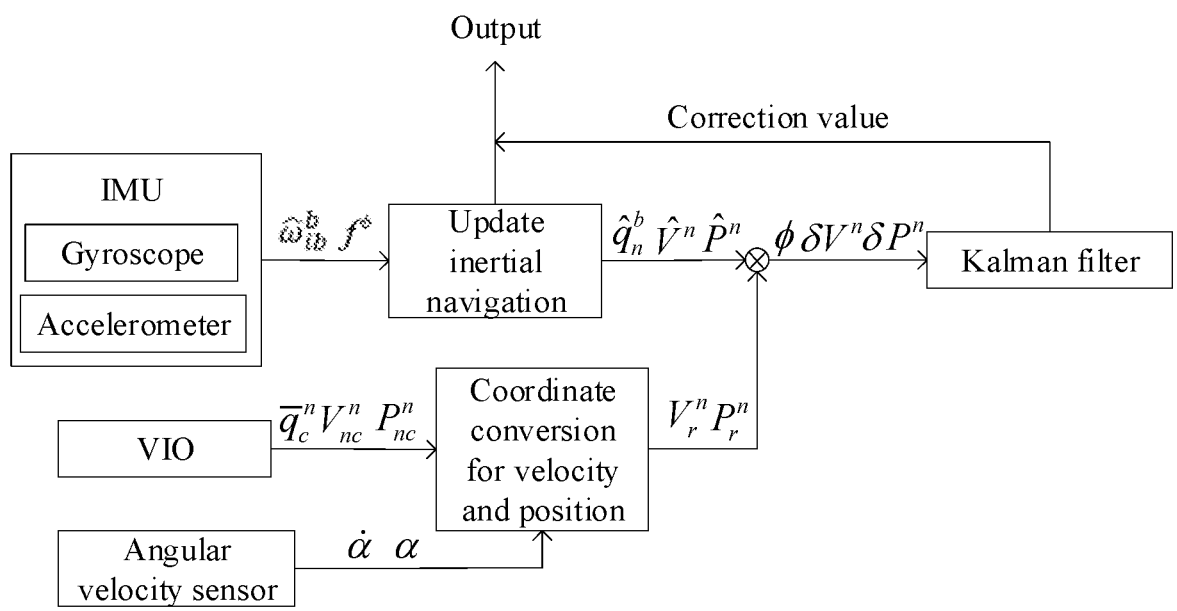
FIG. 5 is a schematic flow chart of another gimbal pose correction method consistent with embodiments of the disclosure.

The vision device 2 may include a visual odometer or a visual inertial odometer. For example, the vision device 2 can include the visual odometer, and the second pose can include the velocity and position of the vertical compensation device. FIG. 5 is a schematic flow chart of another example gimbal pose correction method consistent with the disclosure. As another example, as shown in FIG. 5, the vision device 2 includes the visual inertial odometer (VIO), and the second pose can include the velocity, position, and attitude of the vertical compensation device.

In some embodiments, the vertical compensation device may further include a Time of Flight (TOF) measurement device. In some embodiments, a detection result of the vision device 2 can be corrected by a detection result of the TOF measurement device. For example, the vertical compensation device can obtain the position of the vertical compensation device through a detection of the TOF measurement device, and correct the position of the compensation device obtained by the vision device 2 to obtain an accurate position of the vertical compensation device.

In some embodiments, an Ultra-Wideband (UWB) positioning device can be used instead of the vision device 2, and the pose of the vertical compensation device can be measured by the UWB positioning device. An inertial-UWB integrated navigation method consistent with the disclosure is not interfered by electric current and magnetic field, and can be suitable for various indoor and outdoor environments.

Since the vision device 2 can be fixed on the base 32, the coordinate system of the reference velocity and position of the vertical compensation device directly output by the vision device 2 can be different from the coordinate system of the first pose. The reference velocity and reference position of the vertical compensation device directly output by the vision device 2 cannot be used as the reference of the first pose to correct the first pose. In some embodiments, coordinate conversion can be performed on the reference velocity and the reference position of the vertical compensation device directly output by the vision device 2 to obtain the second pose being in the same coordinate system as the first pose.

In some embodiments, an angular velocity sensor 6 can be arranged at the axis arm 4 and can be configured to obtain a joint angle of the axis arm 4. Before the process at S402, the method may further include obtaining the joint angle of the axis arm 4 based on the angular velocity sensor 6. In some other embodiments, the joint angle of the axis arm 4 can be determined based on a joint angle of the motor 5 that drives the axis arm 4 to rotate. A type of the angular velocity sensor 6 is not limited herein, and any suitable angular velocity sensor 6 can be selected.

In some embodiments, the process at S402 can further include, according to the joint angle, performing the coordinate conversion on the reference velocity of the vertical compensation device output by the vision device 2, obtaining the conversed velocity of the vertical compensation device, and correcting the velocity of the gimbal according to the conversed velocity of the vertical compensation device. In some embodiments, the process at S402 can further include, according to the joint angle, performing the coordinate conversion on the reference position of the vertical compensation device output by the vision device 2, obtaining the conversed position of the vertical compensation device, and correcting the position of the gimbal according to the conversed position of the vertical compensation device.

When the vision device 2 includes the visual inertial odometry, the process at S402 can further include constructing a reference direction cosine matrix of the reference attitude based on the reference attitude output by the visual inertial odometer, and according to the reference direction cosine matrix, obtaining the attitude of the vertical compensation device. Obtaining the attitude of the vertical compensation device according to the direction cosine matrix can include obtaining an attitude correction value of the vertical compensation device according to the reference direction cosine matrix, and obtaining the attitude of the vertical compensation device according to the attitude correction value. Therefore, the attitude of the gimbal can be corrected by the attitude of the vertical compensation device.

At S403, the first pose is corrected according to the second pose.

According to the second pose obtained at S402, the first pose obtained at S401 can be corrected to obtain a pose estimation value of the gimbal. The pose of the gimbal can be controlled according to the pose estimation value to ensure the accuracy of the gimbal pose. In some embodiments, for a three-axis (yaw axis, pitch axis, roll axis) gimbal, correcting the first pose or the gimbal pose can refer to correcting the pose of the gimbal in the direction of the yaw axis, pitch axis, and/or roll axis.

A loop feedback, an optimal estimation, or another algorithm may be used at S403 to fuse the first pose and the second pose to realize the inertial-visual integrated navigation. In some embodiments, a Kalman filter (an optimal estimation algorithm) can be used to fuse the first pose and the second pose. Hereinafter, an implementation process of fusing the first pose and the second pose using the Kalman filter will be described.

In some embodiments, the process at S401 can further include obtaining the angular velocity of the gimbal based on the gyroscope, obtaining the specific force of the gimbal based on the accelerometer, and calculating the error of the first pose according to the angular velocity and the specific force. For example, calculating the error of the first pose according to the angular velocity and the specific force can include, according to the angular velocity and the specific force, constructing an attitude error, a velocity error, and a position error of the first pose, and calculating the error of the first pose according to the attitude error, velocity error and position error.

The process at S403 can include approximating the error of the first pose to obtain the Kalman filter, obtaining a correction value through the Kalman filter by using the second pose as an observation value, and correcting the first pose according to the correction value to realize the correction of the pose of the gimbal in the vertical direction. Herein, approximating the error of the first pose can refer to removing an error term that has a small impact in the error of the first pose.

In some embodiments, as shown in FIG. 5, the gimbal consistent with the disclosure is suitable for the moving shooting at the low-velocity and short-distance, and near the ground. A measurement error model of the gyroscope can be:

$$\tilde{\omega}_{ib}^b = \omega_{ib}^b + b + n_r \quad (7)$$

wherein $n_r$ denotes measurement noise of the gyroscope and is assumed to be a Gaussian white noise. b denotes a zero bias of the gyroscope and is assumed to be a random walk process in a form of $\dot{b}=n_w$, and $n_w$ denotes Gaussian white noise. $\hat{b}$ denotes a zero-bias estimation of the gyroscope. If $\hat{b}$ is a constant zero-bias, then $\dot{\hat{b}}=0$. According to the measurement error model of the gyroscope, it can be obtained that $\omega_{ib}^b = \tilde{\omega}_{ib}^b - b - n_r$ and $\hat{\omega}_{ib}^b = \tilde{\omega}_{ib}^b - \hat{b}$.

The zero bias error of the gyroscope can be defined as:

$$\varepsilon = b - \hat{b} \quad (8)$$

Thus, $\dot{\varepsilon} = \dot{b} - \dot{\hat{b}} = n_w$.

A state quantity of the attitude solution can be defined as $x=[q_b^n \ b]^T$. According to the quaternion differential formula and the measurement error model of the gyroscope, it can be obtained:

$$\begin{bmatrix} \dot{q}_n^b \\ \dot{b} \end{bmatrix} = \begin{bmatrix} \frac{1}{2}\Omega(\tilde{\omega}_{ib}^b - b - n_r)\hat{q}_n^b \\ 0 \end{bmatrix} + \begin{bmatrix} 0 \\ n_w \end{bmatrix}$$

For the state estimator:

$$\begin{bmatrix} \dot{\hat{q}}_n^b \\ \dot{\hat{b}} \end{bmatrix} = \begin{bmatrix} \frac{1}{2}\Omega(\tilde{\omega}_{ib}^b - \hat{b})\hat{q}_n^b \\ 0 \end{bmatrix}$$

Combined with the above formula, a calculation process of an attitude error formula can be as follows. An error quaternion caused by $\hat{q}_b^n$ can be denoted by $\delta q_b^b$, and according to the quaternion multiplication, it can be obtained:

$$q_n^b = \delta q_b^b \otimes \hat{q}_n^b \quad (9)$$

Perform a time derivative on Formula (9), and calculate a state equation of the system according to the attitude:

$$\delta \dot{q}_b^b \approx \frac{1}{2}(\omega_{ib}^b \otimes \delta q_b^b - \delta q_b^b \otimes \hat{\omega}_{ib}^b) \quad (10)$$

Considering the measurement error model (7) of the gyroscope, Formula (10) can be written as:

$$\delta \dot{q}_{b'}^b = \frac{1}{2}(\hat{\omega}_{ib}^b \otimes \delta q_{b'}^b - \delta q_{b'}^b \otimes \hat{\omega}_{ib}^b) - \frac{1}{2}(\varepsilon + n_r) \otimes \delta q_{b'}^b \approx \frac{1}{2}\begin{bmatrix} 0_{1\times 3} & 0 \\ -2\lfloor \hat{\omega}_{ib}^b \times \rfloor & 0_{3\times 1} \end{bmatrix} \cdot \delta q_{b'}^b - \frac{1}{2}\begin{bmatrix} 0 \\ \varepsilon - n_r \end{bmatrix}$$

The attitude angle offset of the {b'} system relative to the {b} system is denoted as $\phi$. Consider $\phi$ to be a small angle, the approximate expression of $\delta q_b^b$ can be $$\delta q_{b'}^b = \begin{bmatrix} 1 & \frac{\phi}{2} \end{bmatrix}^T,$$

which can be inserted into Formula (11) to obtain:

$$\dot{\phi} = -\hat{\omega}_{ib}^b \times \phi - \varepsilon - n_r \quad (12)$$

The state equation of attitude error can be:

$$\begin{bmatrix} \dot{\phi} \\ \dot{\varepsilon} \end{bmatrix} = \begin{bmatrix} -\lfloor \hat{\omega}_{ib}^b \times \rfloor & -I_{3\times 3} \\ 0_{3\times 3} & 0_{3\times 3} \end{bmatrix} \cdot \begin{bmatrix} \phi \\ \varepsilon \end{bmatrix} + \begin{bmatrix} -I_{3\times 3} & 0_{3\times 3} \\ 0_{3\times 3} & I_{3\times 3} \end{bmatrix} \cdot \begin{bmatrix} n_r \\ n_w \end{bmatrix} \quad (13)$$

A calculation process of the velocity error can be as follows. According to the specific force formula, an error-free ideal velocity value can be determined according to the following differential formula:

$$\dot{V}^n = C_b^n f^b - (2\omega_{ie}^n + \omega_{en}^n) \times V^n + g^n$$

where $g^n$ represents an acceleration of gravity in the navigation coordinate system. The gimbal consistent with the disclosure is suitable for the moving shooting at low-velocity and short-distance, and near the ground. Thus, $\omega_{ie}^n$ and $\omega_{en}^n$ can be approximately ignored, such that the approximate velocity error calculation formula can be as follows:

$$\delta\dot{V}^n = -\phi^n \times \hat{f}^n + \nabla^n \quad (14)$$

wherein $\nabla^n$ denotes a projection of an accelerometer zero offset in the navigation coordinate system.

A calculation process of the position error can be as follows. Unlike conventional integrated navigation using the latitude and longitude to represent the position, the method consistent with the disclosure can use the visual navigation for position measurement, and is suitable for the moving shooting at low-velocity and short-distance, and near the ground. Therefore, a position error formula in the form of distance can be as Formula (15):

$$\delta\dot{P}^n = \delta V^n \quad (15)$$

Combining the calculation formulas of the attitude error, velocity error, and position error, the error of the first pose (i.e., the error formula of the integrated navigation system) can be obtained as:

$$\dot{X} = FX + Gw \quad (16)$$

The system state quantity X can be:

$$X = [\phi_x{}^b \phi_y{}^b \phi_z{}^b \delta V_x{}^n \delta V_y{}^n \delta V_z{}^n \delta P_x{}^n \delta P_y{}^n \delta P_z{}^n \varepsilon_x \varepsilon_y \varepsilon_z \nabla_x \nabla_y \nabla_z]^T$$

A state transition matrix F can be:

$$F = \begin{bmatrix} -\lfloor \hat{\omega}_{ib}^b \times \rfloor & 0_{3\times3} & 0_{3\times3} & -I_{3\times3} & 0_{3\times3} \\ \lfloor \hat{f}^n \times \rfloor & 0_{3\times3} & 0_{3\times3} & 0_{3\times3} & C_b^n \\ 0_{3\times3} & I_{3\times3} & 0_{3\times3} & 0_{3\times3} & 0_{3\times3} \\ 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} \end{bmatrix}$$

where $\lfloor \hat{\omega}_{ib}^b \times \rfloor$ is anti-symmetric matrix of $\hat{\omega}_{ib}^b$, $\lfloor \hat{f}^n \Delta \rfloor$ is anti-symmetric matrix of $\hat{f}^n$.

A system noise vector w can be:

$$w = [n_r, n_w, n_a]^T$$

where $n_r$ denotes the noise of the gyroscope, $n_w$ denotes the random walk noise of the gyroscope, and $n_a$ denotes noise of the accelerometer.

A noise distribution matrix G can be:

$$G = \begin{bmatrix} I_{3\times3} & 0_{3\times3} & I_{3\times3} \\ 0_{3\times3} & 0_{3\times3} & C_b^n \\ 0_{3\times3} & 0_{3\times3} & 0_{3\times3} \\ 0_{3\times3} & I_{3\times3} & 0_{3\times3} \\ 0_{3\times3} & 0_{3\times3} & I_{3\times3} \end{bmatrix}$$

Perform discretization and first-order approximation on Formula (16) to obtain a discretized error calculation formula for the first pose, and design the Kalman filter using the discretized error calculation formula for the first pose.

In some embodiments, the vision device 2 can include the visual inertial odometer. In some embodiments, the observation value of the Kalman filter described above can be designed according to an output result of the visual inertial odometer. The specific design process can be as follows.

The reference attitude output by the visual inertial odometer is denoted as $\bar{q}_c^n$, and the cosine matrix of the reference direction is denoted as $\bar{C}_n^c$. In some embodiments, a heading reference output by the visual inertial odometer can be used as a heading observation of the integrated navigation system, and it is considered that the {b} series and the {c} series are completely aligned.

Assume positive unit vectors of the three axes of the navigation coordinate system {n} are:

$$v_x^n = \begin{bmatrix} 1 \\ 0 \\ 0 \end{bmatrix}, v_y^n = \begin{bmatrix} 0 \\ 1 \\ 0 \end{bmatrix}, v_z^n = \begin{bmatrix} 0 \\ 0 \\ 1 \end{bmatrix}$$

The projection of a heading reference vector in the {b} system (e.g., a reference vector in x direction of the {b} system) can be:

$$v_x^b = \bar{C}_n^c v_x^n \quad (17)$$

According to the specific force formula, a unit projection of the gravity reference vector in the {b} system (e.g., the reference vector in z direction of the {b} system), when the gimbal is completely still, can be:

$$v_z^b = \frac{\hat{f}^b}{\|\hat{f}^b\|} \quad (18)$$

According to the orthogonal relationship of the coordinate system, the reference vector $v_y^b$ in y direction of the {b} system can be obtained from $v_z^b$ and $v_x^b$. The direction cosine matrix of the reference attitude constructed by $v_x^b$, $v_y^b$, and $v_z^b$ can be as follows:

$$\bar{C}_n^b = [v_x^b v_y^b v_z^b] \quad (19)$$

The reference attitude quaternion $\bar{q}_n^b$ can be obtained from $\bar{C}_n^b$, and the attitude correction quaternion can be:

$$\delta\bar{q} = \bar{q}_n^b \otimes \hat{q}_b^n = \left[\cos\frac{|\phi|}{2} \quad \frac{\phi}{|\phi|}\sin\frac{|\phi|}{2}\right]^T \quad (20)$$

$\hat{q}_b^n$ in Formula (20) is a latest estimation of the attitude quaternion. Under the condition of small angle, according to the above formula, the observation of the attitude correction can be obtained as follows:

$$\bar{\phi} = [2\delta\bar{q}_1 2\delta\bar{q}_2 2\delta\bar{q}_3]^T \quad (21)$$

where $\delta\bar{q}_1$, $\delta\bar{q}_2$, and $\delta\bar{q}_3$ are the error quaternion.

The observation formula for attitude correction can be:

$$Z_\phi = \bar{\phi} = H_\phi X + v_\phi \quad (22)$$

where $v_\phi$ denotes attitude observation noise. $H_\phi = [I_{3\times3} \ 0_{3\times12}]$ and $v_\phi = [v_{\phi x} \ v_{\phi y} \ v_{\phi z}]^T$.

Using Formula (22) as the attitude observation formula of the Kalman filter, the attitude correction value $\hat{\phi}$ output by the Kalman filter can be used to correct the updated attitude value of the gimbal obtained by Formula (4), and the corrected attitude output can be obtained to realize the correction of the attitude of the gimbal.

A velocity and position vector $[V_{nc}^n \ P_{nc}^n]^T$ output by the visual inertial odometer can include the velocity and position of the camera coordinate system {c} relative to the {n} system, and a velocity observation and a position observation of the {b} system are needed to be obtained. Mechanical errors are not considered herein. During the rotation of the axis arm 4, a parallelogram mechanism of the axis arm 4 can ensure that an end plane of the axis is always parallel to the bottom surface of the base 32. Therefore, there is only translational motion between the {b} system and the {p} system.

According to the output of the visual inertial odometer and a geometric and dynamic transmission relationship of the mechanical structure, the reference velocity $V_r^n$ and reference position $P_r^n$ of the axis arm 4 can be solved as follows:

$$V_r^n = C_p^n V_r^p = C_p^n (V_{nc}^p + \Delta V^p) = V_{nc}^n + C_p^n \Delta V^p \quad (23)$$

$$P_r^n = C_p^n P_r^p = C_p^n (P_{nc}^p + \Delta P^p) = P_{nc}^n + C_p^n \Delta P^p \quad (24)$$

where $C_p^n$ denotes the direction cosine matrix from the {p} system to the {n} system, $\Delta P^p$ is a projection of a relative position vector from $O_b$ to $O_c$ in the {p} system, and $\Delta V^p$ is a projection of a relative velocity vector from $O_b$ to $O_c$ in the {p} system.

Denote $[O_x\ O_y\ O_z]^T$ as a position offset vector from $O_c$ to $O_p$ in the {p} system. Denote the joint angle of the axis arm 4 as α, when the axis arm 4 is parallel to the base 32, α=0, and define the counterclockwise direction as the positive direction. Define the length L of the axis arm 4 as the length from the rotation center line of the axis arm 4 to the end of the axis (i.e., the end of the axis arm 4 connected to the gimbal). $\Delta P^p$ can be calculated according to the following formula:

$$\Delta P^p = \begin{bmatrix} \Delta P_x^p \\ \Delta P_y^p \\ \Delta P_z^p \end{bmatrix} = \begin{bmatrix} -O_x + L \cos \alpha \\ O_y \\ O_z + L \sin \alpha \end{bmatrix} \quad (25)$$

$\Delta V^p$ is calculated according to the following formula:

$$\Delta V^p = \begin{bmatrix} \Delta V_x^p \\ \Delta V_y^p \\ \Delta V_z^p \end{bmatrix} = \begin{bmatrix} L\dot\alpha \cos \alpha \\ 0 \\ -L\dot\alpha \sin \alpha \end{bmatrix} \quad (26)$$

According to Formulas (23) and (24), the reference velocity vector $V_r^n$ and reference position vector $P_r^n$ can be obtained, the velocity observation formula and position observation formula of the integrated navigation system can be obtained as:

$$Z_V = \hat{V}^n - V_r^n = H_V X + v_V \quad (27)$$

$$Z_P = \hat{P}^n - P_r^n = H_P X + v_P \quad (28)$$

where $H_\phi = [0_{3\times3}\ I_{3\times3}\ 0_{3\times9}]$, $v_V = [v_{Vx}\ v_{Vy}\ v_{Vz}]^T$, $H_P = [0_{3\times6}\ I_{3\times3}\ 0_{3\times6}]$, $v_P = [v_{Px}\ v_{Py}\ v_{Pz}]^T$, $v_V$ is the velocity observation noise, and $H_P$ is the position observation noise.

Formula (27) can be used as the velocity observation formula of the Kalman filter, a velocity correction value can be output through the Kalman filter, and the updated speed value obtained by the velocity correction value and Formula (5) can be corrected to obtain a corrected velocity output, thereby realizing the correction of the velocity of the gimbal. Formula (28) can be used as the position observation formula of the Kalman filter, the position correction value can be output through the Kalman filter, and the updated position value obtained by the position correction value and Formula (6) can be corrected to obtain a corrected position output, thereby realizing the correction of the position of the gimbal.

The method consistent with the disclosure can adopt the inertial-vision integrated navigation mode, and correct the second pose obtained by the vision device 2 based on the first pose obtained by the IMU 1 to obtain the pose satisfying the requirements of the control bandwidth and accuracy. The inertial-visual integrated navigation mode consistent with the present disclosure is not interfered by electric current and magnetic field, and can be suitable for various indoor and outdoor environments.

Referring again to FIGS. 1 to 3, the present disclosure further provides the gimbal pose correction device. The device may include the vertical compensation device connected to the gimbal, the vision device 2 arranged at the vertical compensation device, and the IMU 1 arranged at the vertical compensation device. The vertical compensation device can be configured to compensate for the movement of the gimbal in the vertical direction, and the vision device 2 and the IMU 1 can be electrically connected to the vertical compensation device.

The vertical compensation device can be configured to obtain the first pose of the gimbal based on the IMU 1, obtain the second pose of the vertical compensation device based on the vision device 2, and correct the first pose according to the second pose.

The vertical compensation device further includes the main body 3 and the axis arm 4 connected to the gimbal. The axis arm 4 can rotate to compensate for the movement of the gimbal in the vertical direction. The IMU 1 can be arranged at the axis arm 4, and the vision device 2 can be arranged at the main body 3.

The vision device 2 can include the visual odometer, and the second pose can include the velocity and position of the vertical compensation device. The vision device 2 can includes the visual inertial odometer, and the second pose can include the velocity, position, and attitude of the vertical compensation device.

The vertical compensation device can include the axis arm 4 connected to the gimbal. The axis arm 4 can rotate to compensate for the movement of the gimbal in the vertical direction. The angular velocity sensor 6 can be arranged at the axis arm 4. The vertical compensation device can be configured to obtain the joint angle of the axis arm 4 based on the angular velocity sensor 6.

The first pose can include the velocity of the gimbal. The vertical compensation device can be configured to perform the coordinate conversion on the reference velocity of the vertical compensation device output by the vision device 2 according to the joint angle, and obtain the velocity of the vertical compensation device.

The first pose can include the position of the gimbal. The vertical compensation device can be configured to perform the coordinate conversion on the reference position of the vertical compensation device output by the vision device 2 according to the joint angle, and obtain the position of the vertical compensation device.

The vertical compensation device can be configured to construct the reference direction cosine matrix of the reference attitude based on the reference attitude output by the visual inertial odometer, and obtain the attitude of the vertical compensation device according to the reference direction cosine matrix.

The vertical compensation device can be configured to obtain the attitude correction value of the vertical compensation device according to the reference direction cosine matrix, and obtain the attitude of the vertical compensation device according to the attitude correction value.

The first pose can include the velocity, position, and attitude of the gimbal.

The IMU 1 can include the gyroscope and the accelerometer. The vertical compensation device can be configured to obtain the angular velocity of the gimbal based on the gyroscope, obtain the specific force of the gimbal based on the accelerometer, and calculate the attitude, velocity, and position of the gimbal according to the angular velocity and the specific force.

The vertical compensation device can be configured to design the attitude update formula according to the angular velocity and the specific force, and update the attitude of the gimbal according to the attitude update formula.

The vertical compensation device can be configured to design the velocity update formula according to the angular velocity and the specific force, and update the velocity of the gimbal according to the velocity update formula.

The vertical compensation device can be configured to design the position update formula according to the angular velocity and the specific force and update the position of the gimbal according to the position update formula.

The IMU 1 can include the gyroscope and the accelerometer. The vertical compensation device can be configured to obtain the angular velocity of the gimbal based on the gyroscope, obtain the specific force of the gimbal based on the accelerometer, and calculate the error of the first pose according to the angular velocity and the specific force.

The vertical compensation device can be configured to construct the attitude error, velocity error, and position error of the first pose according to the angular velocity and the specific force, and calculate the error of the first pose according to the attitude error, velocity error, and position error.

The vertical compensation device can be configured to approximate the error of the first pose to obtain the Kalman filter, obtain the correction value through the Kalman filter by using the second pose as the observation value, and correct the first pose according to the correction value.

For simplification purposes, detailed descriptions of the operations of exemplary devices are omitted and references can be made to the descriptions of the exemplary methods. The devices described above are merely exemplary. The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure. Those skilled in the art can understand and implement without creative work.

The terms "first," "second," or the like in the specification, claims, and the drawings of the present disclosure are merely used to distinguish similar elements, and are not intended to describe a specified order or a sequence. In addition, the terms "including," "comprising," and variations thereof herein are open, non-limiting terminologies, which are meant to encompass a series of steps of processes and methods, or a series of units of systems, apparatuses, or devices listed thereafter and equivalents thereof as well as additional steps of the processes and methods or units of the systems, apparatuses, or devices.

The gimbal pose correction method and device consistent with the disclosure are described in detail above. It is intended that the disclosed embodiments be considered as exemplary only and not to limit the scope of the disclosure. Changes, modifications, alterations, and variations of the above-described embodiments may be made by those skilled in the art within the scope of the disclosure.

What is claimed is:

1. A gimbal pose correction method comprising:
   obtaining a first pose of a gimbal based on an Inertial Measurement Unit (IMU) arranged at a vertical compensation device, the vertical compensation device being configured to be coupled to the gimbal and compensate for movement of the gimbal in a vertical direction;
   obtaining a second pose of the vertical compensation device based on a vision device arranged at the vertical compensation device; and
   correcting the first pose according to the second pose.

2. The method of claim 1, wherein:
   the vertical compensation device includes a main body and an axis arm configured to be connected to the gimbal;
   the IMU is arranged at the axis arm; and
   the vision device is arranged at the main body.

3. The method of claim 1, wherein:
   the vision device includes a visual odometer; and
   the second pose includes a velocity and a position of the vertical compensation device.

4. The method of claim 3, wherein:
   the vertical compensation device includes an axis arm configured to be connected to the gimbal and compensate for the movement of the gimbal in the vertical direction via rotation; and
   an angular velocity sensor is arranged at the axis arm;
   the method further comprising, before obtaining the second pose:
   obtaining a joint angle of the axis arm based on the angular velocity sensor.

5. The method of claim 4, wherein:
   the first pose includes a velocity of the gimbal; and
   obtaining the second pose includes performing coordinate conversion on a reference velocity of the vertical compensation device output by the vision device according to the joint angle to obtain a velocity of the vertical compensation device.

6. The method of claim 4, wherein:
   the first pose includes a position of the gimbal; and
   obtaining the second pose includes performing coordinate conversion on a reference position of the vertical compensation device output by the vision device according to the joint angle to obtain a position of the vertical compensation device.

7. The method of claim 1, wherein:
   the vision device includes a visual inertial odometer; and
   the second pose includes a velocity, a position, and an attitude of the vertical compensation device.

8. The method of claim 7, wherein obtaining the second pose includes:
   based on a reference attitude output by the visual inertial odometer, constructing a reference direction cosine matrix of the reference attitude; and
   obtaining an attitude of the vertical compensation device according to the reference direction cosine matrix.

9. The method of claim 8, wherein obtaining the attitude of the vertical compensation device includes:
   obtaining an attitude correction value of the vertical compensation device according to the reference direction cosine matrix; and
   obtaining the attitude of the vertical compensation device according to the attitude correction value.

10. The method of claim 1, wherein the first pose includes a velocity, a position, and an attitude of the gimbal.

11. The method of claim 10, wherein:
the IMU includes a gyroscope and an accelerometer;
obtaining the first pose includes:
- obtaining an angular velocity of the gimbal based on the gyroscope;
- obtaining a specific force of the gimbal based on the accelerometer; and
- calculating the attitude, the velocity, and the position of the gimbal according to the angular velocity and the specific force.

12. The method of claim 11, wherein calculating the attitude, the velocity, and the position of the gimbal includes:
- designing an attitude update formula according to the angular velocity and the specific force; and
- updating the attitude of the gimbal according to the attitude update formula.

13. The method of claim 11, wherein calculating the attitude, the velocity, and the position of the gimbal includes:
- designing a velocity update formula according to the angular velocity and the specific force; and
- updating the velocity of the gimbal according to the velocity update formula.

14. The method of claim 11, wherein calculating the attitude, the velocity, and the position of the gimbal includes:
- designing a position update formula according to the angular velocity and the specific force; and
- updating the position of the gimbal according to the position update formula.

15. The method of claim 10, wherein:
the IMU includes a gyroscope and an accelerometer;
obtaining the first pose of the gimbal includes:
- obtaining an angular velocity of the gimbal based on the gyroscope;
- obtaining a specific force of the gimbal based on the accelerometer; and
- calculating an error of the first pose according to the angular velocity and the specific force.

16. The method of claim 15, wherein calculating the error of the first pose includes:
- constructing an attitude error, a velocity error, and a position error of the first pose according to the angular velocity and the specific force; and
- calculating the error of the first pose according to the attitude error, the velocity error, and the position error.

17. The method of claim 15, wherein correcting the first pose according to the second pose includes:
- approximating the error of the first pose to obtain a Kalman filter;
- obtaining a correction value through the Kalman filter by using the second pose as an observation value; and
- correcting the first pose according to the correction value.

18. A gimbal pose correction device comprising:
- a vertical compensation device configured to be connected to a gimbal and compensate for movement of the gimbal in a vertical direction;
- a vision device arranged at and electrically coupled to the vertical compensation device; and
- an Inertial Measurement Unit (IMU) arranged at and electrically coupled to the vertical compensation device;

wherein the vertical compensation device is further configured to:
- obtain a first pose of the gimbal based on the IMU;
- obtain a second pose of the vertical compensation device based on the vision device; and
- correct the first pose according to the second pose.

19. The device of claim 18, wherein:
the vertical compensation device includes a main body and an axis arm configured to be connected to the gimbal, the axis arm being configured to rotate to compensate for the movement of the gimbal in the vertical direction;
the IMU is arranged at the axis arm; and
the vision device is arranged at the main body.

20. The device of claim 18, wherein:
the vision device includes a visual odometer; and
the second pose includes a velocity and a position of the vertical compensation device.

* * * * *